Sept. 14, 1937.  J. W. JOHNSON  2,092,847
EGG HANDLING TRAY
Filed July 8, 1935  2 Sheets-Sheet 1
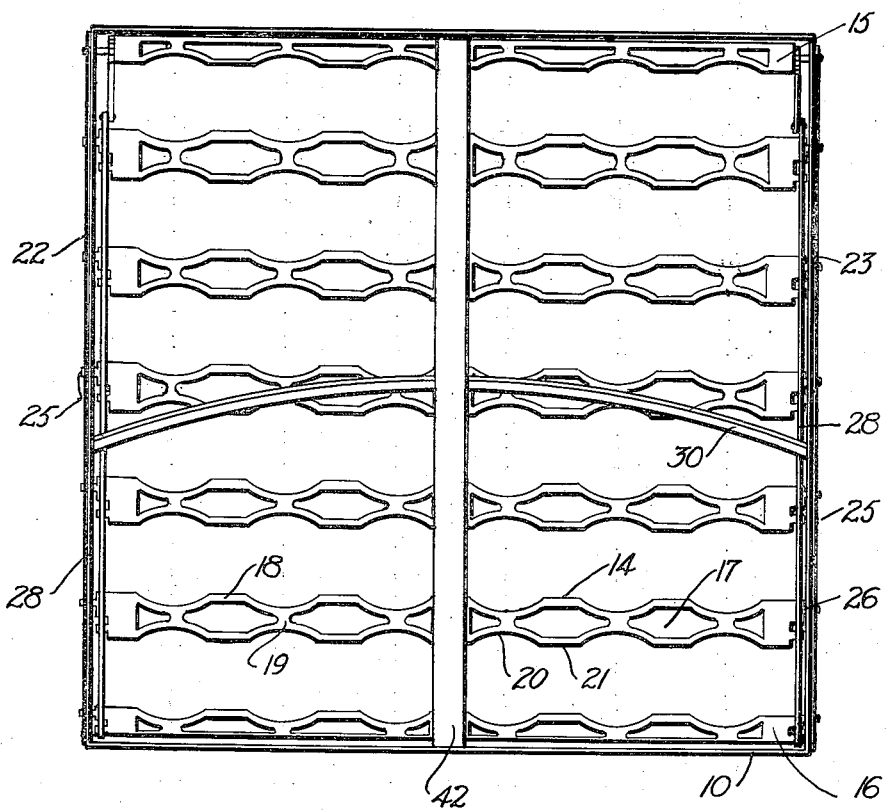
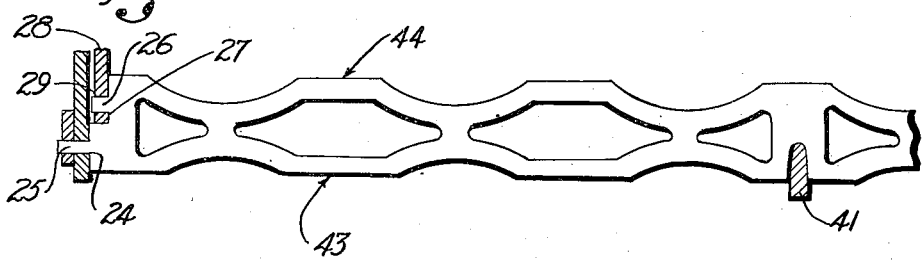
INVENTOR
JAMES W. JOHNSON
BY
James M. Abbott
ATTORNEY Sept. 14, 1937.     J. W. JOHNSON     2,092,847
EGG HANDLING TRAY
Filed July 8, 1935     2 Sheets-Sheet 2
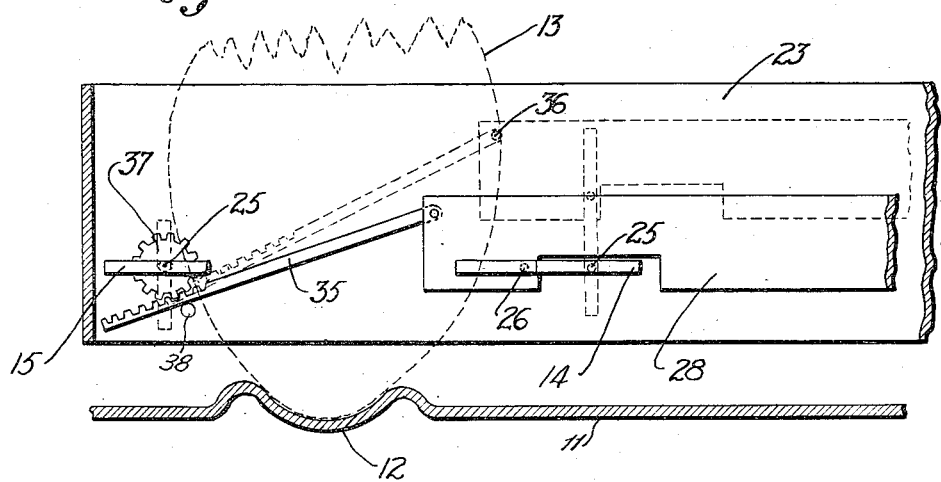
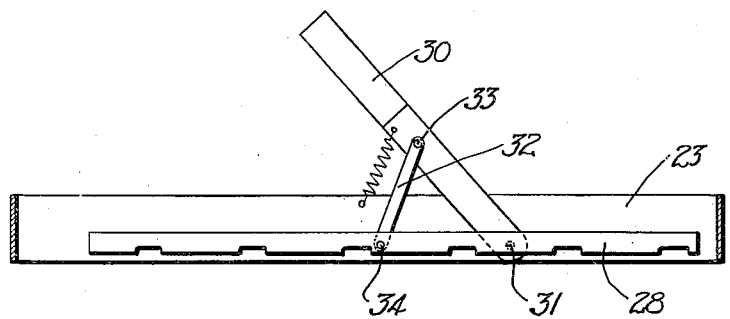
INVENTOR
JAMES W. JOHNSON
BY
James M. Abbott
ATTORNEY Patented Sept. 14, 1937

2,092,847

UNITED STATES PATENT OFFICE 2,092,847

EGG HANDLING TRAY

James W. Johnson, Los Angeles, Calif., assignor of one-half to A. H. Massey, Los Angeles, Calif.

Application July 8, 1935, Serial No. 30,251

2 Claims. (Cl. 294—87)

This invention relates to an egg handling tray, of the type shown in my patent No. 2,011,972, of which the present structure is an improvement.

In the processing and packing of eggs it is usual to dip the eggs in a liquid, such for example as a thin oil, and to thereafter remove the eggs, then allow them to drain and to be subsequently packed in cartons for the market. It is the principal object of the present invention to provide a tray by which a large number of eggs may be simultaneously picked up, thereafter dipped into a container of a processing solution, then removed while still in the tray, and then simultaneously deposited in egg packing cartons.

It is a further object of the present invention to provide an egg handling tray which is so designed as to insure that when the tray with the eggs is lifted from the processing solution the eggs may drain readily, and the supporting members may also rapidly drain so that there will not be a possibility for the processing solution to adhere to the eggs, or the parts of the tray, thus limiting the waste of a considerable amount of processing solution, and also making it possible for the processed eggs to be deposited in cartons without being accompanied by an objectionable deposit of the processing solution upon the parts of the carton.

The present invention contemplates the provision of a frame structure carrying a plurality of flexible leaves pivotally mounted at their opposite ends with relation to the frame and adapted to be simultaneously moved to egg holding and egg releasing positions, said leaves being formed from a minimum amount of metal producing a foraminous frame structure whereby a minimum amount of surface will occur on each of the leaves and to which surface the processing solution would have a tendency to adhere.

The invention is illustrated by way of example in the accompanying drawings in which:

Figure 1 is a view in plan showing the preferred form of the present invention.

Fig. 2 is an enlarged fragmentary view in section and elevation showing the frame and mounting for the blades.

Fig. 3 is a view in section and elevation taken transversely of the blades and showing the operating means therefor, including means for producing reverse operation of an end blade.

Fig. 4 is a view similar to Fig. 3 showing a section of the frame with the blades in their lifting positions.

Referring more particularly to the drawings, 10 indicates a rectangular frame. For practical purposes this frame is made of a length to accommodate a row of six eggs which agrees with the length of a carton in which eggs are usually packed, and the frame is of a width to accommodate a plurality of pairs of rows of eggs agreeing with the width of a plurality of cartons into which the eggs are packed. In order to appreciate the utility of the present invention it should be explained that eggs are delivered to the processing and packing plant in cases within which a layer of eggs is packed with the individual eggs standing on end and separated by cardboard separators while the eggs rest upon fillers, such as indicated at 11 in Fig. 3 of the drawings, the fillers being formed with indentations 12 upon which the eggs stand endwise as indicated by the dotted line 13 in Fig. 3. The eggs are unpacked from the cases by removing the separator strips of a layer of eggs to allow the eggs to stand in their individual rows and within the recesses 12 of the supporting filler sheet 11. While in this position the egg handling tray, as shown in Fig. 1, is lowered to engage the eggs and thereafter lift it with the eggs seated and spaced from each other so that the batch of eggs in the tray may be submerged in a processing solution and then raised when placed over cartons into which they are subsequently deposited. The frame structure 10 is preferably made of suitable overall dimensions so that it may fit within an egg case to receive the eggs and so that it may be readily deposited over a plurality of egg cartons to subsequently deposit the eggs for packing without requiring any handling of the eggs whatsoever. The frame structure carries a plurality of lifting blades 14 which engage eggs along their opposite edges and end lifting blades 15 and 16 which engage the eggs only along one edge. All of the blades are characterized by the fact that they are formed from relatively thin sheets of metal from the body of which a maximum amount of metal has been cut away to produce a skeleton structure having lateral flexibility but sufficient rigidity to support the weight of the eggs which may be carried upon it. Perforations, such as indicated at 17, are formed through the body of the blades and thus leave a relatively narrow marginal area of metal as indicated at 18 which defines the contour of the edges of the blades and which portions are tied together at intervals by webs 19. The opposite marginal edges of the blades 14 are formed with a series of arcuate scallops 20 between which straight portions 21 occur. The scallops of the contiguous marginal edges of adjacent blades combine to conform a seat for an egg as indicated at 13. Since, however, the blades are pivoted upon longitudinal axes one edge of a blade will swing upwardly underneath an egg while a contiguous edge of an adjacent blade must swing downwardly and force its way past the egg.

Referring more particularly to Fig. 2 of the drawings the mounting for the pivotal blades is shown. Here it will be seen that the side frame portions 22 and 23 of the main frame 10 are formed with perforations 24 through which trunnions 25 of the blades extend. These trunnions are disposed adjacent to one edge of the blade. At a point substantially equi-distant from the opposite edge of the blade tangs 26 project from the end of the blades. The end of the blade is offset rearwardly as indicated at 27 and from this offset face the tang 26 extends. Due to this arrangement a space will occur between a portion of the end face of each of the blades to accommodate a shifting bar 28 which is formed with a plurality of perforations 29, each of which receives one of the tangs. The shifting bars 28 may be moved longitudinally by operation of a bail 30 which is pivoted by its opposite ends to the side portions 22 and 23 of the frame by pivot pins 31. This bail carries operating levers 32 which are pivoted at their one ends to side arms of the bail by pins 33 and which are pivoted at their opposite ends to the shifting bars 28 by pins 34. In this manner a swinging motion of the bail toward an upright position will cause the bars 28 to shift and dispose all of the blades in alignment in a common plane. It will be recognized that at the ends of the tray beyond the last lifting blade 14 it will be necessary to provide blades which engage eggs on one side only, as indicated at 15 and 16. These blades are substantially half the width of the blades 14 and must of necessity swing in a manner to cooperate with the blades 14. The blade 16 will swing in unison and in the same direction as the direction of rotation of all of the blades 14 but the blade 15 must swing in an opposite direction. This is accomplished by the movement of the shifting bars 28 which are fitted with means to produce this reverse rotation, as, for example, by a gear rack 35 which is pivoted at a point upon a pin 36 carried by the shifting bars. The rack 36 is in mesh with a pinion 37 which is carried upon trunnions of the blade 15. The rack is supported upon a pin 38 over which it rides. Thus, as the rack 36 shifts longitudinally, the pinion rotates to rotate the blade 15. It will be understood that this particular reverse motion mechanism might be used to advantage, although other simple equivalent devices could be used if desired.

Attention is directed to the fact that due to the eccentric position of the trunnions 25 with relation to the central longitudinal axis of each of the blades it is possible to move the blades into a common plane at a level close to the bottom edge of the portions of the frame. Thus when the frame is resting upon the filler 11, the point of engagement with the eggs will be quite close to the filler to make it possible to swing the blades into position at a level materially below the major transverse diameter of the egg. This will prevent exertion of excessive pressure on the walls of the eggs as the levers swing to their seated position and will support the eggs at the lowest possible point with relation to the mouth of the carton into which they are to be dropped. Due to the fact that the lifting blades are made from a minimum amount of metal and are quite flexible it is desirable to support the blades at points intermediate their ends. This is accomplished by one or more transversely extending supporting bars as indicated by the numeral 41 in Fig. 2 of the drawings. These supporting bars stand edgewise so that they will lend a maximum supporting strength to the lifting blades, and have an upper edge lying substantially in a coincident plane with the longitudinal center of the blades so that when the blades are swung from vertical positions to horizontal positions the blades will rest directly upon the upper face of the supporting bars. In order to conveniently lift and carry the structure a supporting handle 42 is provided and connected by its opposite ends to the frame 10 so that the bail may be operated with the same hand of the operator which grasps the handle.

In operation of the present invention the device is assembled as shown in the drawings. The bail is swung to its uppermost position so that all of the lifting blades are aligned in parallel planes. The entire tray may then be placed down over the eggs which are upstanding in the recesses 12 of the filler sheet 11. The bail may then be swung downwardly and this will simultaneously shift the two shifting bars longitudinally and swing the lifting blades 14 and the lifting blade 16 to a horizontal plane. At the same time the lifting blade 15 will swing to the same horizontal plane from an opposite direction. As the blades swing, their lowermost edges 43 will swing beneath the egg and their uppermost edges 44 will swing downwardly along the side of the egg, flexing as they move, and will assume a position in alignment with the upwardly swinging edge 43 of the adjacent blade. The entire tray may then be lifted by the handle 42, after which the tray with the eggs may be submerged in a processing solution and then withdrawn. The processing liquid will thereafter readily drain from the eggs and the blades, making it possible to place the tray over a desired number of cartons and swing the bail upwardly to move the shifting blades to vertically aligned parallel positions. The draining of the solution is facilitated due to the skeleton formation of the blades whereby a maximum amount of blade surface has been eliminated to thus insure that an undesirable amount of solution will not adhere and accumulate upon the blades, and will therefore not be wasted and possibly deposited upon the carton within which the eggs are packed.

It will thus be seen that the invention here disclosed provides means whereby a plurality of eggs may be picked up, transported, and discharged from the tray in a simple operation, and in a manner to make it possible to dip the eggs in a processing solution and to readily drain the liquid from the parts of the tray and the eggs without danger that the solution will be deposited on the carton in which the eggs are packed.

While I have shown the preferred form of my invention, as now known to me, it will be understood that various changes might be made in the combination, construction, and arrangement of parts, by those skilled in the art, without departing from the spirit of the invention as claimed.

Having thus described my invention what I claim and desire to secure by Letters Patent is:

1. An egg handling tray comprising a rigid frame structure, a plurality of lifting blades pivotally mounted upon parallel axes within said frame structure, said blades including a set of blades designed to rotate simultaneously in a single direction and another blade designed to rotate in unison therewith and in an opposite direction, means for simultaneously rotating said lifting blades toward and away from positions of alignment in a common plane, recesses formed in the blades in the edge which is lowermost when the blades stand parallel, and supporting means extending transversely of the blades and adapted to occupy the recesses when the blades are vertically aligned and to provide an intermediate support for the blades when the blades lie in a common plane.

2. In an egg handling tray to be submerged in a processing solution and comprising a rigid rectangular frame structure, a plurality of lifting blades pivotally mounted in opposite end portions of said frame structure, said blades being characterized as having lateral flexibility and a skeleton formation whereby a minimum liquid collecting surface will occur on the blades, means for simultaneously rotating the blades on their longitudinal axes toward and from a common plane in which they are in alignment, recesses formed in one edge of each of the blades and a bar carried by the frame and extending transversely of the blades to set within the recesses when the blades are in vertically aligned positions and to support the blades when the blades lie flat in their horizontally aligned positions.

JAMES W. JOHNSON.